June 20, 1939. W. C. SHAW 2,162,757
FLUID BRAKE CONSTRUCTION
Filed Jan. 30, 1933 5 Sheets-Sheet 4
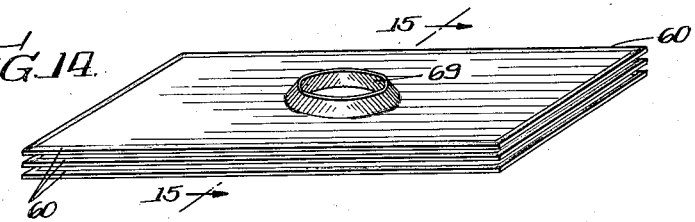
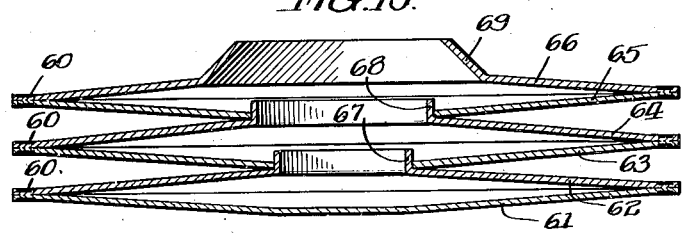
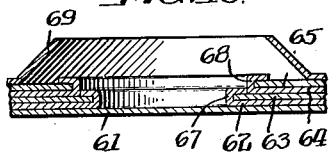
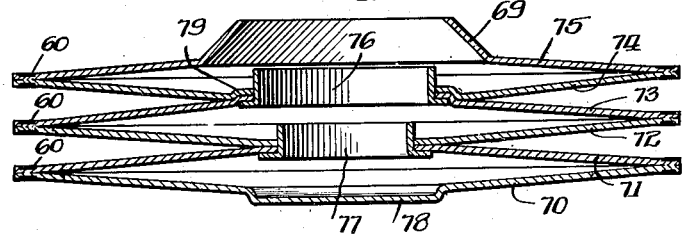
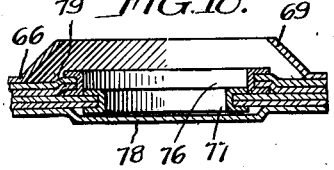
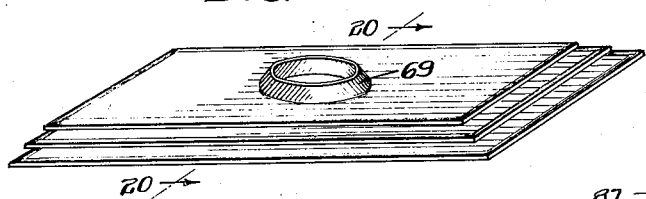
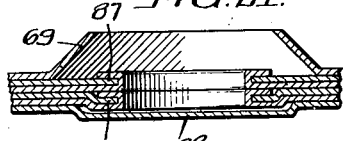
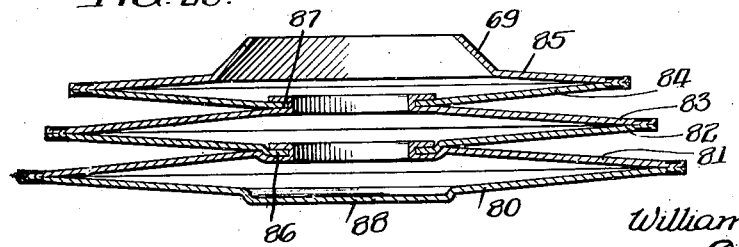
Inventor
William Clifford Shaw
By: Cox x Moore attys June 20, 1939.  W. C. SHAW  2,162,757
FLUID BRAKE CONSTRUCTION
Filed Jan. 30, 1933   5 Sheets-Sheet 5
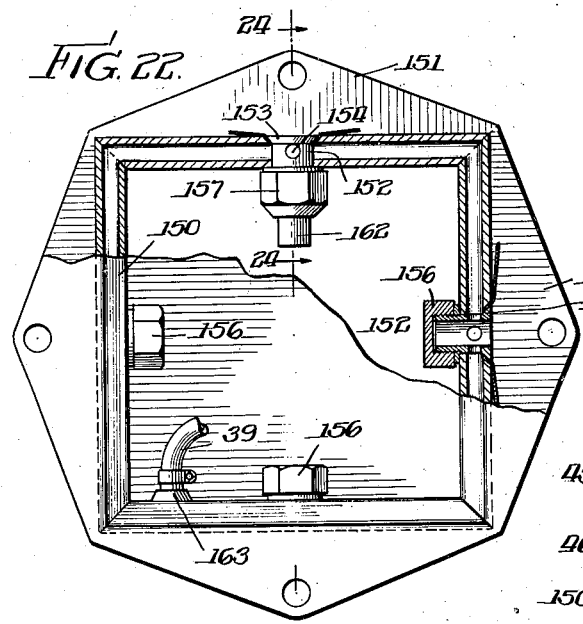
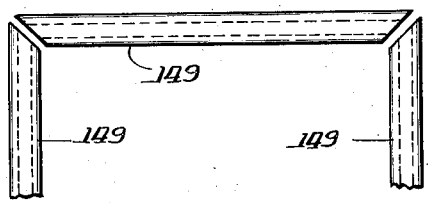
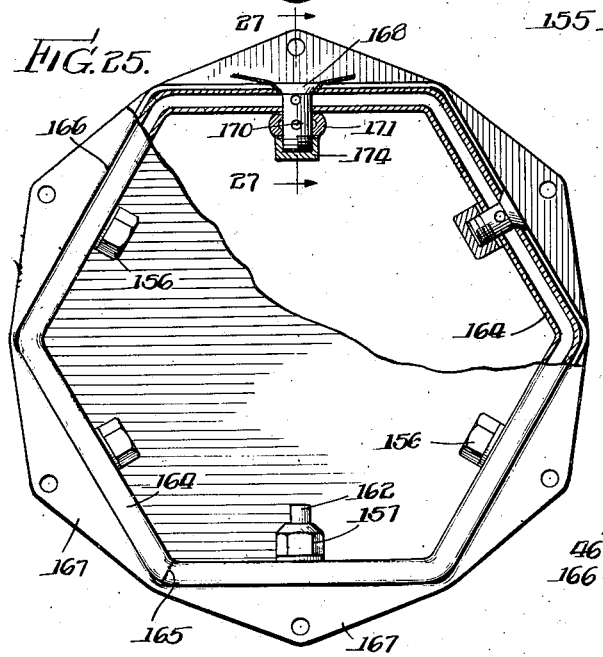
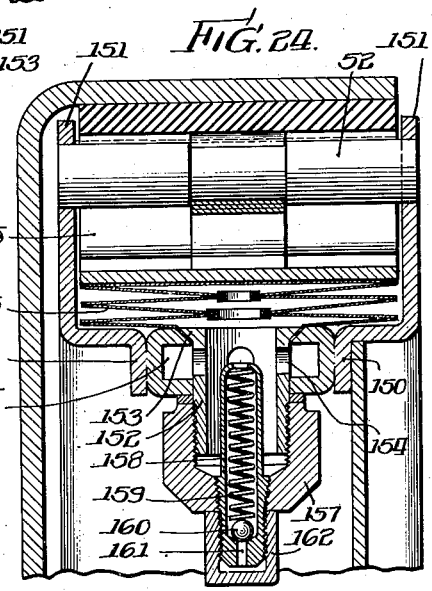
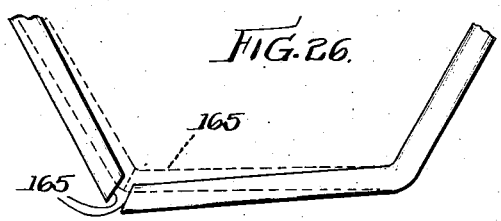
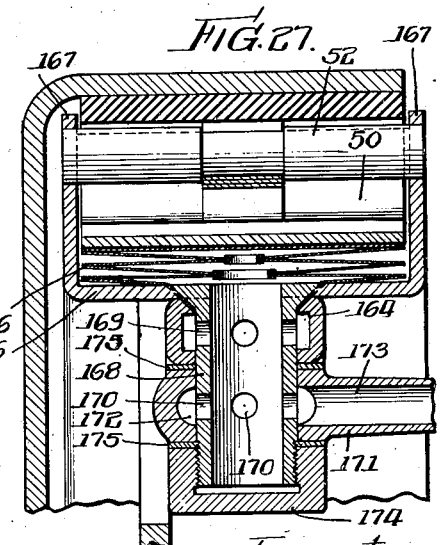
Inventor:
William Clifford Shaw,
By: Cox + Moore attys Patented June 20, 1939

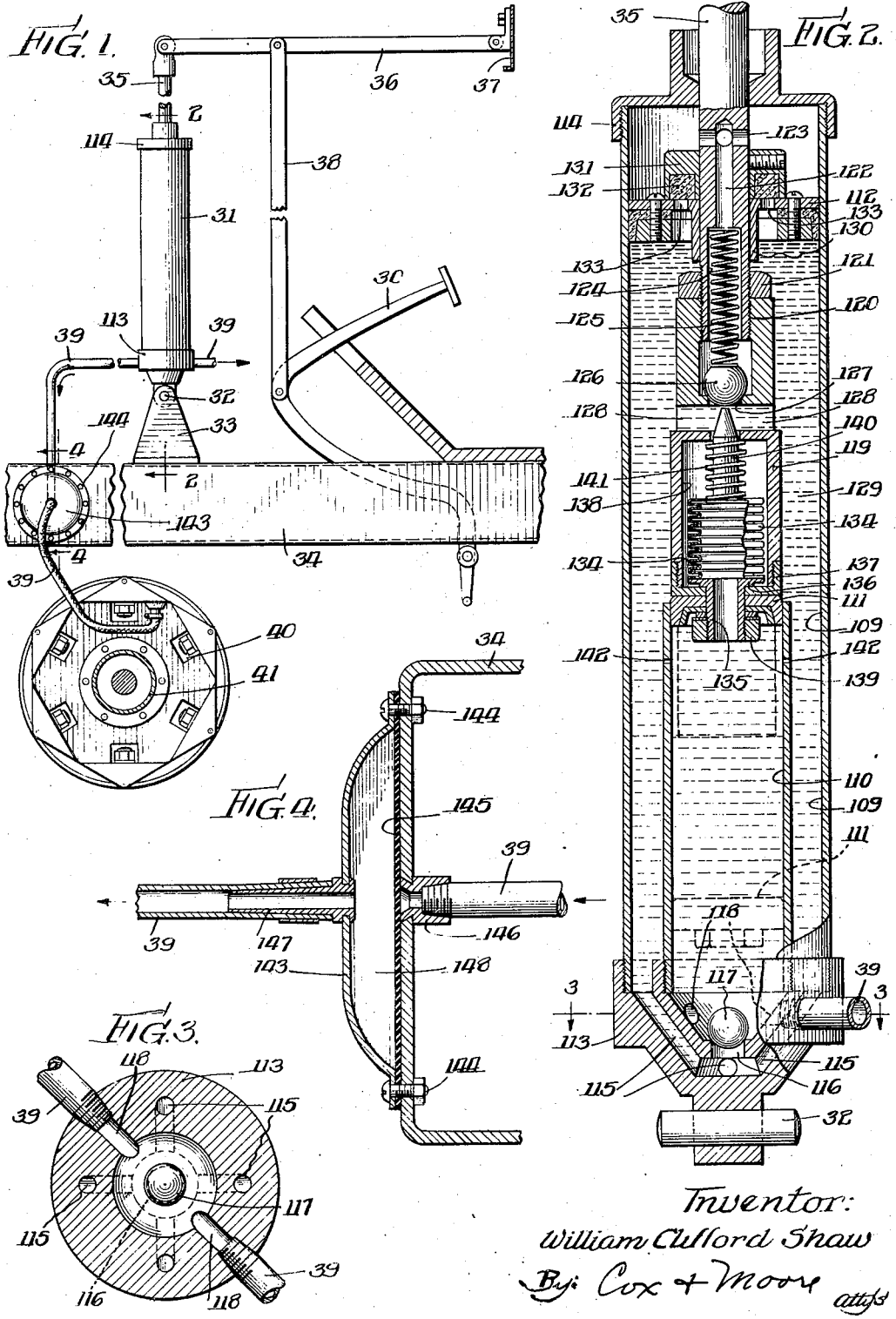

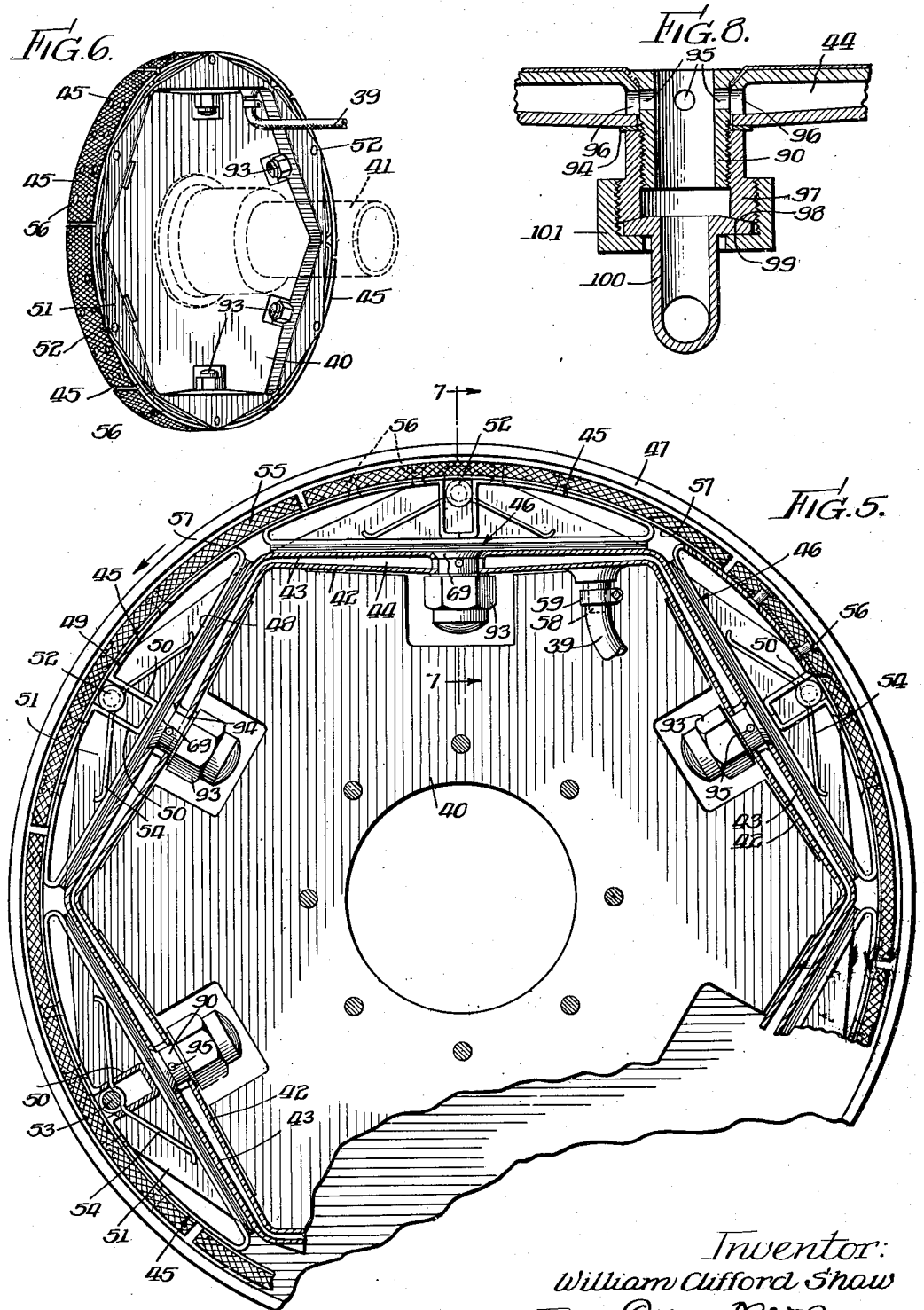

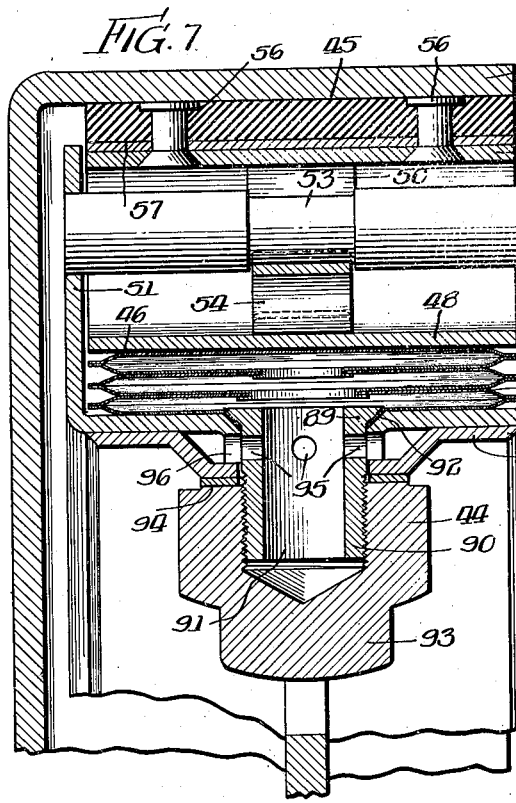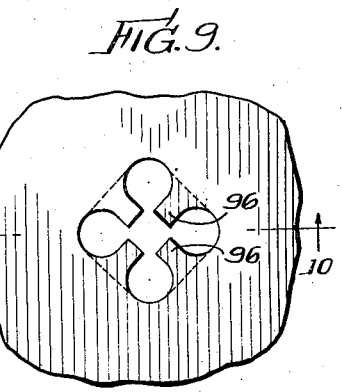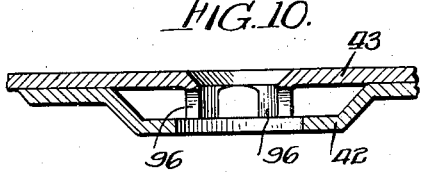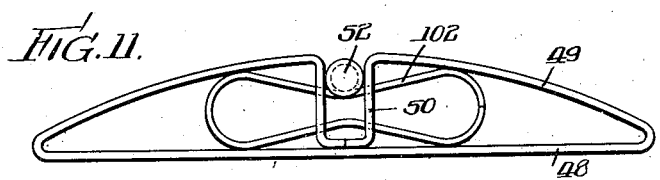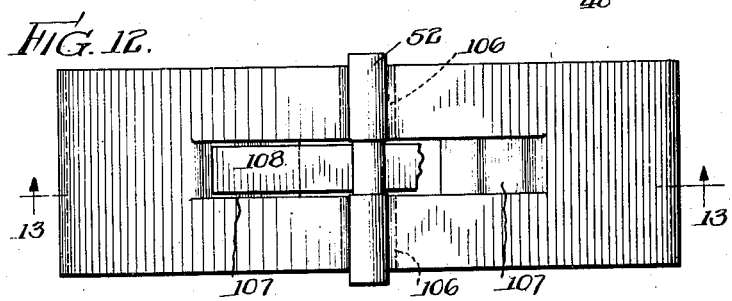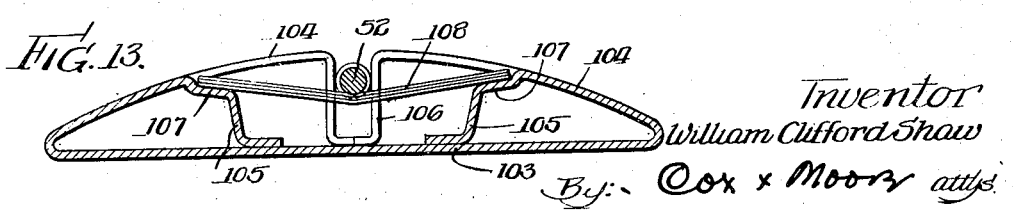

2,162,757

UNITED STATES PATENT OFFICE 2,162,757

FLUID BRAKE CONSTRUCTION

William Clifford Shaw, Woodstock, Ontario, Canada, assignor, by mesne assignments, to Linderman Devices, Incorporated, Wilmington, Del., a corporation of Delaware Application January 30, 1933, Serial No. 654,279

35 Claims. (Cl. 188—152)

This invention relates to fluid pressure and vacuum-operated mechanisms and provides instrumentalities adaptable for the general application and transmission of power, which are durable, highly efficient in operation, inexpensive to manufacture and assemble, and which are capable of utilization in connection with various types of devices.

It is an object of the invention to provide a fluid pressure operated power device wherein the fluid pressure operated friction members are arranged in an improved manner, particularly with respect to the fluid pressure operating means. More specifically, it is an object of the invention to provide a fluid pressure operated power device, specifically illustrated as a brake mechanism for automotive vehicles or the like, wherein the friction or brake shoes are operated by metallic diaphragm means wherein the operating surfaces of the diaphragm means are rectangular, and wherein these operating surfaces of the diaphragms are substantially commensurate in size with the shoes whereby to increase the effective gripping effort of the shoes per unit of fluid pressure within the fluid operating system.

A further object of the invention is to provide a fluid pressure operated power device wherein the friction shoes are operated by diaphragm means, and wherein the diaphragms comprise superposed substantially flat metallic plates collapsible to form a relatively shallow superposed chamber diaphragm operating mechanism.

A further object of the invention is to provide an improved mounting for the friction shoes, the shoes being supported in floating arrangement upon their operating diaphragms, and the diaphragms in turn being supported upon a flange construction which may be used as a fluid conduit for supplying fluid to the diaphragms.

A further object of the invention is to provide a fluid pressure operated power device of the type defined wherein the friction shoes and the diaphragm operating means are in substantially continuous circumferential arrangement whereby to increase the effective gripping or braking effort of the friction or braking shoes per unit of fluid operating pressure within the diaphragm means, and also to minimize bending or twisting stresses within the shoes themselves.

A still further object is to provide each brake or friction shoe with a portion of the braking material thereof overlapping an adjacent brake shoe whereby to prevent turning of the brake shoes and insure uniformity of action and ready release of each of the shoes.

Other objects of this invention will appear hereinafter as the description thereof proceeds, the novel features, arrangements, and combinations being clearly set forth in the specification and claims hereunto appended.

Fig. 1 represents more or less diagrammatically the means for operating the brake and its connection to an operator-controlled part;

Fig. 2 is a cross-section taken substantially along the line 2—2 of Fig. 1;

Fig. 3 is a section taken along the line 3—3 of Fig. 2;

Fig. 4 is a cross-section taken along the line 4—4 of Fig. 1;

Fig. 5 is a cross-sectional view taken through the brake drum, brake shoes, and supporting means for the latter in a plane parallel to the plane of the wheel;

Fig. 6 is a perspective view of the brake applying mechanism shown in Fig. 5;

Fig. 7 is a section taken along the line 7—7 of Fig. 5;

Fig. 8 shows a modification of the means shown in Fig. 7;

Fig. 9 is a detail view of a portion of the rim which supports the brake shoe illustrating a preliminary step in the formation of the means for preventing collapse of the fluid chamber formed at the periphery of said rim;

Fig. 10 is a section taken along the line 10—10 in Fig. 9;

Fig. 11 is a side elevational view of the brake shoe;

Fig. 12 is a plan view of a modified form of brake shoe;

Fig. 13 is a section taken along the line 13—13 of Fig. 12;

Fig. 14 is a perspective view of one form of diaphragm constructed according to my invention;

Fig. 15 is a section taken along the line 15—15 of Fig. 14 showing the diaphragm in a partially completed state;

Fig. 16 is a view similar to Fig. 15 showing the finished diaphragm;

Figs. 17 and 18 are views similar to Figs. 15 and 16 showing a modified form of my invention;

Fig. 19 is a view similar to Fig. 14 showing a still further modification of the diaphragm;

Fig. 20 is a section taken along the line 20—20 of Fig. 19;

Fig. 21 is a view similar to Fig. 20 showing the diaphragm in collapsed position;

Fig. 22 shows a modified construction for the means which supports the brake shoes and diaphragms, and distributes the pressure fluid to the diaphragms;

Fig. 23 is a fragmentary view illustrating a step in the construction of the device illustrated in Fig. 22;

Fig. 24 is a cross-section similar to Fig. 7, but illustrating the modified construction shown in Fig. 22 with the brake shoe, brake drum, and diaphragms applied thereto. The section is substantially along the line 24—24 of Fig. 22;

Fig. 25 shows a still further modification of the brake shoe supporting means;

Fig. 26 is a fragmentary view illustrating a step in the formation of the device illustrated in Fig. 25; and Fig. 27 is a view similar to Fig. 24, the section being taken substantially along the line 27—27 of Fig. 25.

In Fig. 1 of the drawings, the reference numeral 30 illustrates the brake pedal of an automobile. The device for creating the fluid pressure is indicated by the reference numeral 31 and is pivoted at 32 to a bracket 33 mounted on the frame 34 or other support so that it may rock for a purpose which will appear shortly. The operating rod 35 for the pressure creating device 31 is connected at its upper end to a lever 36 which is pivoted thereto and to a support such as the instrument board 37 of an automobile. The lever 36 is connected by a link 38 to the brake pedal 30. Leading from the pressure creating device 31 are a plurality of flexible conduits 39 which lead to each of the brakes on the automobile. The number of the flexible conduits necessary, of course, will vary with the different types of machines with which this invention is adapted to be used.

The pressure creating device 31 may be used with any fluid for actuating the brakes but is particularly adapted for use with liquid. Any fluid could be used in the braking system, however, and as far as concerns the brake mechanism upon the wheels of the automobile, various means of producing the operating fluid pressure might be employed.

The pressure which is transmitted by the pressure device 31 through the conduits 39 enters a plurality of flexible diaphragms thereby causing them to expand and urge the brake shoes into engagement with the brake drum. The construction of the braking mechanism is illustrated best in Figs. 5 to 21 inclusive.

Referring more particularly to Figs. 5, 6, 7, 9, and 10, it will be seen that there is a central web section 40 which is adapted to be secured in any desired manner to the housing of the rear axle which in the present instance has been taken as the support for the braking mechanism although it is to be understood that this device is equally applicable to the front wheels of an automobile in which the web section 40 is attached to the pivoted axle which supports the wheel. In Fig. 6, I have illustrated the rear axle housing in dotted lines at 41. The outer periphery of the web section 40 is in the form of a multi-sided polygon, and in the present instance, I have illustrated the polygon as having six sides. To this web section there is welded a peripheral chamber composed of the members 42 and 43 which have cross-sections substantially as illustrated in Figs. 7 and 10 and are provided with a space 44 therebetween for reception of the fluid which is supplied to the brakes.

Disposed about the six sides of the polygon are six brake shoes indicated generally by the reference character 45 and interposed between the brake shoes and the outer surface of the polygon are diaphragms 46 which upon expansion urge the brake shoes outwardly toward the brake drum 47. The brake shoe illustrated in Figs. 5, 7, and 10 consists of a continuous strip of flat metal having the diaphragm engaging portion 48, a brake lining supporting portion 49, and bracing portions 50, the latter being formed from the ends of the sheet metal and being permanently secured to the portion 48 by welding or the like to form a unitary brake shoe having a flat side for engaging the diaphragm and a curved side for the brake lining. It is to be noted that the brake shoes are supported solely by the diaphragms. No additional supporting means for the shoes need be provided. The diaphragms not only effect the dual function of both supporting and operating the shoes, but by reason of the mounting provided the shoes will readily accommodate themselves to the positioning of the diaphragm in the structure and no bending stresses within the shoes will be set up.

The member 43 has upstanding flanges 51, pairs of which have aligned openings for the reception of the retaining pins 52. These pins are interposed between the portions 50 on the brake shoes and prevent the peripheral movement thereof. The center sections of these pins are smaller in diameter than the portions which pass through the openings in the flanges 49 as indicated at 53 in Fig. 7. Springs 54, having the central portions thereof arranged within the recesses formed by the small diameter portions 53 of the pins 52, have their free ends engaging the portions 48 of the brake shoes to move them inwardly toward the axis of rotation of the wheel. This prevents the brake shoes from dragging when it is not desired to have any braking action and the fluid in the diaphragms 46 has been exhausted.

To the outer surfaces of each of the brake shoes, I secure brake lining 55 by means of rivets 56. It will be noted that the brake lining 55 is secured to only about one-half of the brake shoe and the remaining portion of the brake lining overlaps an adjacent brake shoe in the direction of rotation of the brake drum. With this arrangement, a better braking action results than if the brake lining were secured entirely to one brake shoe. This arrangement also helps to keep the brake shoes properly lined up with each other in a peripheral direction and to prevent chattering which might result from a rocking movement of the brake shoes. In order to prevent destruction of the brake lining itself, I secure the brake lining to a strip of brass or other material 57 which is arranged between the brake shoes and the lining as clearly illustrated in Fig. 5.

It will be noted that the movement of the brake shoes is substantially radial and the pressure is applied substantially throughout 360° of the brake drum surface. Most brakes use only a small arc contact and in consequence they must have a tenacious and expensive lining in order to accomplish the braking action. With 360° of contact and wear, the brake lining can be modest in cost because the wear is very little as compared with the ordinary brake. The servo or self-energizing action is avoided due to the substantially radial presentation of the brake shoes to the brake drum. This servo action has been long regarded as uncertain in amount on account of its dependency on the condition of the friction surface.

Brake systems employing my invention also have the advantage that the braking pressure is applied simultaneously to the four brakes of the usual automobile which employs a brake on each of the wheels and thereby the possibility of skidding on account of unequal deceleration is eliminated. In the servo action since the action depends upon the character of the friction surface for the amount of brake pressure applied, the pressure applied to all four brakes does not occur simultaneously and is apt not to be equal in amount.

It will be noted that by having the brake lining secured to one shoe with a portion thereof overlapping the other shoe, the rocking or teetering of the brake shoe is eliminated. This prevents any chattering which might otherwise occur due to the fact that the brake shoe is mounted on a pin and is permitted to rock about that pin when the brakes are being released unless prevented from doing so such as by means of the overlapping brake lining already referred to. However, I do not wish to limit myself to this particular means for preventing the rocking movement of the brake shoe.

Without for the present going into the details of the diaphragm construction, I wish to describe the action of the brake as the pressure is applied. The connection to the chamber 44 is through an inlet 58 which has operative fluid-tight communication with one of the flexible conduits 39 which may be secured to the inlet 58 by a clamp 59 or the like. The fluid which is introduced into the chamber 44 enters the diaphragm 46 and expands the same whereby the pressure is applied to the brake shoes in a direction toward the brake drum. Since there is a single chamber for the fluid, the pressure on each brake shoe is equalized and there is a uniform retarding effect on the drum throughout substantially 360° thereof. When the pressure on the fluid is released, the springs 54 move the brake shoes inwardly as the diaphragms 46 collapse.

A very important feature of my invention is the construction of the metal diaphragm and the connection of that metal diaphragm to the remaining portion which forms the chamber 44. One form of diaphragm is perhaps best illustrated in Figs. 14, 15, and 16. I have shown a diaphragm constructed with three sections, but this may be increased or decreased as desired. The diaphragm is made up of a series of flat leaves, the outer edges of which are welded together as at 60 throughout their entire peripheral meeting edges, although I do not wish to limit myself to welding the edges together as they may be secured together in other manners if desired. However, welding insures a permanent fluid-tight joint which is greatly desired in such a diaphragm. I shall refer to the various leaves of the diaphragm by the reference numerals 61, 62, 63, 64, 65, and 66. The leaf 61 is practically flat except when the diaphragm is expanded as in Fig. 15. The leaf 62 has a central opening with a flange 67 extending upwardly about that opening and this flange fits snugly within a central opening in leaf 63. Correspondingly, there is a flange 68 on leaf 64 extending through a central opening in leaf 65, while the upper leaf 66 has a conical flange 69 surrounding the central opening therein. The leaves 61 and 62 are first joined together at their outer peripheral edges while separate from the other leaves and similarly each pair of leaves 63 and 64, and the leaves 65 and 66 are joined at their peripheral edges before being assembled with the other leaves in the manner illustrated in Fig. 15. The pair of leaves are then assembled in the manner illustrated in Fig. 15 and an upsetting tool is introduced through the opening in the leaf 66 for bending the flanges 67 and 68 outwardly over the edges of the respective leaves 65 and 63 to form a fluid-tight joint between the adjacent leaves of the diaphragm. If desirable, these leaves may have the edges around the openings welded together instead of connected in the manner just described. Each of the openings bounded by the respective flanges 67, 68, and 69 is successively larger than the preceding opening so that when the leaves are collapsed, they lie flat against each other.

In Figs. 17 and 18, I have shown a modification of the diaphragm construction. In this form of the invention, the leaves 70, 71, 72, 73, 74, and 75 correspond respectively to the leaves 61 to 66 inclusive in the modification just described. The pairs of leaves are secured at their outer peripheries by welding the same as in the previous embodiment described, and the upper leaf 75 is constructed the same as leaf 66. Leaves 73 and 74 are connected by what I shall call an eyelet 76, and leaves 71 and 72 are connected by a similar eyelet 77. The eyelets are first formed as illustrated in Fig. 17 and are arranged with the flanged portion thereof between the pairs of leaves before the pairs of leaves are welded together at their outer peripheries. The pairs of leaves are then assembled as in Fig. 17 and a tool is inserted into the opening in the upper leaf 75 to form the upper flange on each of the eyelets flanged portion thereof between pairs of leaves together. The lower leaf 70 is provided with an offset portion 78 so as to permit the leaves 70 and 71 to collapse perfectly with respect to each other, and similarly the leaves 73 and 74 are offset at 79 for the same purpose. This permits the leaves to collapse flat against each other as is clearly illustrated in Fig. 18. It will be understood that the brake shoe against which the leaf 70 abuts will be formed with a recess to receive the offset portion 78. However, while the offset portion 78 appears to be rather large in the drawings, actually it is scarcely noticeable due to the fact that the metal which is used is relatively thin.

In Figs. 19, 20, and 21, I have illustrated a still further modification of the diaphragm in which the leaves 80, 81, 82, 83, 84, and 85 correspond to leaves 70 to 75 inclusive in Figs. 17 and 18. In this form of the invention, the leaves 81 and 82 are first joined together by the overlapping joint 86 which is similar to that illustrated in Figs. 15 and 16. Also the leaves 83 and 84 are similarly joined at 87. The openings in the respective leaves, however, are of the same diameter and therefore the overlapping joints will abut against each other and necessitate an offset portion such as 88 in the lower leaf 80. The pairs of leaves are then joined at their outer peripheries by welding or the like. In this form of the invention, it has been found much easier to weld the leaves, as the pairs of leaves which are to be joined together are successively smaller in both dimensions from the bottom to the top as viewed in Fig. 20. In other words, by having the leaves 82 and 83 of less width and length than the leaves 80 and 81, a clearance is provided whereby suitable welding machinery may be used to weld leaves 81 and 80 together. Instead of welding the edges together, however, I may prefer to fold portions of the edges of the leaves over each other or merely solder or otherwise secure the edges together. In each form of the invention shown in Figs. 14 to 21 inclusive, I have used the reference character 69 to designate the conical flange on each of the leaves 66, 75, and 85.

I prefer to form the leaves of the diaphragm from resilient metal having long life and capable of assisting the diaphragm in collapsing. In other words, by using a spring metal which normally is shaped to a single plane, and joining successive leaves together, I can form a diaphragm which when the fluid pressure is released will, of its own action, tend to collapse the diaphragm away from the brake shoe. The result of this is that the spring pressure of 54 need not be as great as would otherwise be necessary, or may be eliminated altogether.

While I have illustrated the diaphragm in Figs. 15, 17, and 20 as being expanded to a considerable extent, it is to be understood that in actual practice the expansion of the diaphragm is very small and if it is desired to reduce the amount of expanse of each section of the diaphragm, I can increase the number of sections and get the same amount of total movement of the brake shoe. The number of sections necessary will depend on the desired movement of the brake and the flexibility of the diaphragms without rupturing.

I shall now describe the manner in which each of the diaphragms is secured to the rim formed by the members 42 and 43 and the manner in which the diaphragm is held in liquid-tight communication with the chamber 44. Before the diaphragm is completely assembled, the conical head 89 of a hollow bolt 90 is arranged with the conical surface thereof in engagement with the inner side of the conical flange 69, the flange may be fastened as by welding to the conical head to prevent turning of the bolt and to secure liquid-tight communication between the hollow central portion 91 of the bolt and the inside of the diaphragm. The member 43 is provided with a conical seat 92 and the diaphragm is inverted from the position shown in Fig. 15 to that shown in Fig. 7 with the outer surface of the conical flange 69 against the seat 92 in Fig. 7. The hollow bolt 90 extends through openings in the members 43 and 42 and is threaded to receive the nut 93. A washer 94 interposed between the nut 93 and member 42 assists in forming a liquid-tight joint when the nut is tightened to hold the diaphragm in place. The bolt is also provided with lateral passages 95 extending outwardly from the central passage 91. These passages 95 communicate with the chamber 44 and permit the free passage of the fluid between the diaphragm 46 and chamber 44. Since there is apt to be a considerable strain placed on the nut 93 in order to provide a liquid-tight joint, and also because the reactionary pressure of the diaphragm against the member 43 is apt to cause the members 42 and 43 to move toward each other, I preferably provide means surrounding the bolt 90 for preventing movement of members 43 and 42 toward each other. This means comprises a series of four lugs 96 formed in the member 43 around the opening through which the bolt 90 extends. The member 43 is first formed as illustrated in Fig. 9 and then the lugs 96 are struck downwardly at right angles to the plane of the member 43, the lugs being just sufficiently long enough to engage the member 42 so that when the nut 93 is tightened, the lugs 96 brace the walls 42 and 43 and prevent the collapse of the chamber 44 and the consequent leakage which would result. If desired, instead of using a separate inlet for the fluid pressure as illustrated at 58 in Fig. 5, I may use one of the bolts 90 as an inlet for the fluid pressure. In so using the bolt 90, I use a device such as that illustrated in Fig. 8 in which there is provided a hollow nut 97 which takes the place of the nut 93 shown in Fig. 7 and this has a conical seat 98 which coacts with a seat 99 on the hollow conduit 100 to which the flexible conduit 39 may be connected. The members 97 and 100 are held together by means of a nut 101 which has threads cooperating with similar threads on the member 97. The fluid then passes through the member 100 and bolt 90 into the chamber 44.

In Fig. 11, I have shown a modified spring for moving the brake shoe inwardly toward the axis of rotation of the wheel. This spring is to take the place of spring 54. This spring 102 is formed from a single piece of wire shaped as illustrated clearly in Fig. 11, there being several coils of the same shape to make a spring of substantial width to fit within the recess formed by the smaller diameter portion 53 of the pin 52.

In Figs. 12 and 13, I have illustrated a still further modification of brake shoe and spring for moving the same inwardly out of engagement with the brake drum. This brake shoe has the diaphragm engaging portion 103, the brake lining supporting portion 104, and bracing portions 105 and 106, the ends of which are secured to the portions 103 by welding or the like. Portions 107 of the bracing portions 105 are arranged below the brake lining supporting portion 104 for supporting the ends of a leaf spring 108 which may be composed of one or more leaves. The portions 105 and 107 are preferably, but not necessarily, struck from the sheet of metal forming the brake shoe. The function of this spring is the same as for the springs 54 and 102. It will be obvious that the expansible diaphragm may be used wherever an expansible chamber finds utility.

From the description, it will be seen that when the pressure is introduced into the chamber 44, it passes through the passages 95 in the bolt 90 and then into the diaphragms 46 to expand the same. The expansion of the diaphragms causes the brake shoes to move outwardly against the action of the spring 54 into engagement with the brake drum 47. It is desired that this part of the movement of the brake shoes be accomplished in a relatively short period of time and in accomplishing this result, the amount of pressure necessary is not very great. After the brake shoes engage the brake drum, it is desired to apply a greater force to the brake shoes to stop the rotation of the wheel to which the brake drum is applied, and it is not so important that there be a great amount of movement of the brake shoe for there is practically very little movement of the brake shoes during the actual braking operation. To accomplish these results, I provide the pressure creating device 31 which has already been mentioned and the details of this device are illustrated clearly in Figs. 2 and 3.

The pressure creating device 31 comprises a fluid containing chamber composed of two cylinders 109 and 110 in which the pistons 112 and 111 operate respectively. These pistons may be constructed in any suitable manner to provide a fluid-tight engagement between the peripheries of the pistons and their respective cylinders. The cylinder 109 is threaded into a base member 113, and the cap 114 closes the upper end of the cylinder 109. The cylinder 110 is also threaded into the base member 113 as clearly illustrated in Fig. 2. The base member 113 rocks on the pivot 32 previously described. The cylinder 110 is completely filled with a fluid and the cylinder 109 is partially filled with a fluid or it is entirely possible to have it completely filled if desired. Communication between cylinders 109 and 110 is established through the passages 115 and central opening 116, the latter normally being closed by a ball valve 117. The ball valve prevents movement of the fluid from the cylinder 110 through the opening 116 and passages 115 into cylinder 109 but permits the flow of the fluid in the opposite direction from the cylinder 109 to the cylinder 110. The conduits 39 communicate with the cylinder 110 through the passages 118 and therefore fluid is not supplied to the conduits 39 from the cylinder 109 except when the ball valve 117 is raised off its seat.

The operating rod 35 carries both the piston 111 and 112. The piston 111 is rigidly secured to the end of the casting 119 threaded at 120 to the rod 35 and secured in place with respect thereto by the lock nut 121. The end of the connecting rod 35 has a longitudinal passage 122 and radial passages 123 communicating therewith and opening into the cylinder 109 above the piston 112. The longitudinal passages 122 communicate with an enlarged extension 124 of that passage in which there is arranged a spring 125 engaging a ball valve 126 which seats on the peripheral edge of a central opening 127 in the casting 119. The casting has lateral passages 128 communicating with the interior of the cylinder 109 beneath the piston 112 whereby the fluid 129 within the cylinder 109 may be forced upwardly through the opening 127, passages 124, 122, and 123, into the cylinder 109 above the piston 112 when the pressure of the fluid is sufficient to raise the ball valve 126 off its seat. Thus when the piston moves downwardly and a pressure is created on the fluid 129 sufficiently to raise the ball valve 126, the ball valve will raise and permit the flow of the fluid in the manner just described. However, I prefer to raise the ball valve 126 by mechanical means controlled by the pressure of the fluid in the cylinder 110 so that during the time the fluid is passing from beneath the piston 109 through the passages just described to a position above the piston 112, there will be no pressure within the cylinder 109 which must be overcome by a counter pressure on the brake pedal 30. The reason I do this is that after the brake shoes have come into contact with the brake drum, the piston 112 is no longer active and therefore should be free to move within the cylinder 109 without requiring additional pressure to by-pass the fluid around the piston 112 as will appear more clearly hereinafter.

The piston 112 is provided with a sleeve 130 which slides on the outer surface of the operating rod 35 between the lock nut 121 and valve 131 provided with the leather or composition washer 132 for closing the openings 133 arranged peripherally of the piston 112 and extending from one side thereof to the other. It will be noted from an inspection of Fig. 2 that when the piston is in its upper position, namely, the position which it occupies during the downward movement of the operating rod 35, the openings 133 are closed by the leather or composition washer 132. Thus when the piston 122 is moving downwardly, the fluid as it by-passes the piston must pass through the opening 127 and passages 124, 122 and 123. Normally, however, the ball valve 126 prevents this by-passing movement of the fluid during the first part of the downward movement of the operating rod.

During the time that both the pistons 112 and 113 are moving downwardly and are both operative, the ball valve 117 is lifted off its seat to permit the fluid to pass from the cylinder 109 to the cylinder 110, and from there the fluid passes into the conduits 39 to expand the metal diaphragms and move the brake shoes outwardly into engagement with the interior of the brake drum in the manner previously described.

By using both the cylinders 109 and 110, to supply fluid to the diaphragms, a considerable volume of fluid is supplied to the diaphragms for a comparatively small amount of movement of the brake pedal. However, after the brake shoes engage the brake drum, pressure on the brake shoes is important and not the volume of the fluid supplied to the diaphragms. Therefore, I increase the pressure and in doing this, I decrease also the volume. The actual result is that the piston 112 and the cylinder 109 are rendered totally inoperative and only the piston 111 and cylinder 110 operate. Due to the fact that the pressure is all now concentrated in the cylinder 110, which employs a small piston 111, the pressure on the fluid in the conduits 39 and diaphragms 46 is greatly increased for the same operating pressure on the rod 35 or brake pedal 30. Of course, since the movement of the fluid now is resisted due to the engagement of the brake shoes with the brake drum, the pressure in the cylinder 110 increases and after this pressure reaches a predetermined amount in excess of the pressure created in the cylinders 109 and 110 when both pistons are operating, mechanism is set in operation which opens the ball valve 126 and permits the fluid to be by-passed around the piston 112. This mechanism which is clearly shown in Fig. 2 comprises an expansible diaphragm 134 having a cross-section such as illustrated in Fig. 2 and which is entirely closed except at the lower end. At this end, the diaphragm is secured to a hollow bolt 135 which has a flange 136 secured in fluid-tight engagement with the diaphragm 134 and this flange also abuts against the cap 137, screw-threaded to the casting 119. The diaphragm is arranged within the hollow portion 138 of the casting 119. A nut 139 secures the piston 111 in place on the cap 137 and also holds the hollow bolt 135 in proper relation to the diaphragm 134. To the upper side of the diaphragm there is secured a pin 140, normally spring pressed downwardly by a spring 141 and the tension of this spring and the resistance of the diaphragm 134 determines the pressure which will be necessary to move the pin 140 in an upward direction.

When the pressure on the fluid in both the cylinders 109 and 110 reaches a predetermined amount sufficient to move the pin 140 upwardly into engagement with the ball valve 126, the ball valve is moved off its seat and the fluid in the cylinder 109 is by-passed, in the manner hereinbefore set forth, to the upper side of the piston 112 as the operating rod 35 continues to move downwardly so that the operator does not have to use a certain amount of additional pressure to move this piston through the fluid. In other words, the device operates as if the piston 112 were not in the system at all at this stage of the operation of the master cylinder.

The movement of the piston 111 is thereafter continued until the brakes are fully applied or applied the desired amount. When the operating rod 35 is again moved upwardly, the fluid must again be by-passed around the piston 112 but due to the fact that the pressure in the cylinder 110 drops, the valve 126 closes and the fluid cannot return to the under side of the piston through the passages 123, 122, 124, and opening 127, but must instead find some other way of by-passing the piston 112. This is accomplished by the sliding connection between the sleeve 130 and operating rod 35 for as the piston moves upwardly, the pressure of the fluid above the piston and/or the suction created therebetween causes the piston 112 to slide along the operating rod 35 a sufficient amount to uncover the openings 133. The fluid then flows freely through the openings 133 from the upper side of the piston to the lower side thereof.

In a device of this general nature, wherein a plunger is used to create pressure on a fluid used for operating brakes, there has heretofore been a tendency to build up a pressure far in excess of that desired within the operating cylinder due to what is known as a "pumping action". In other words, if the operating pedal 30 is moved upwardly and downwardly quickly, as is often done by the operator of a vehicle of this nature, the fluid does not have a chance to flow back into the operating cylinder from the brakes quick enough and as a result, some of the fluid such as that within the cylinder 109 of the drawings may enter the cylinder 110 past the piston and therefore put more fluid between the piston and the brakes than is desired. The result is that successive operations may put so much fluid within the operating cylinder that the minimum pressure when the brake is in inoperative position is great enough to hold the brakes in engagement with the brake drum, a condition which is not desirable by any means. In order to eliminate this action, I provide the cylinder 110 with ports 142 which form a communication between the cylinders 109 and 110 when the pistons are fully retracted. In this manner, if there is any pressure built up within the cylinder 110, it is relieved when the parts are in the position shown in Fig. 2, or at least equalized with the pressure within the cylinder 109. The operation of the master cylinder is as follows:

When the brake pedal 30 is depressed, the rod 35 moves downwardly and during the first part of the movement of the rod, both the pistons 111 and 112 are operative to move fluid out through the conduits 39 in the manner previously described. This means that a considerable volume of fluid is distributed through the conduits 39 and the brake shoes are quickly moved into engagement with the brake drum where they meet with resistance and quickly build up a pressure within the conduits 39 and cylinders 109 and 110. As soon as this pressure which is built up is sufficient, it expands the diaphragm 134 and raises the pin 140 sufficiently to unseat the ball valve 126, and thereafter the fluid within the cylinder 109 is by-passed around the piston 112 through the passages 128, 127, 124, 122, and 123, and only the piston 111 is operative, during all subsequent movement of the operating rod 35 in a downward direction. This means that all of the pressure on the operating rod 35 is used to do useful work in moving the brake shoes into engagement with the brake drums. Since the total pressure on the operating rod 35 is now distributed over the operative area of the small piston 111 instead of over the operative area of both the pistons 111 and 112, and since the operative area of piston 111 is considerably less than that of piston 112, the per square inch pressure on the fluid supplied to the diaphragms is greatly increased although the amount of fluid which is flowing for the same amount of movement of the rod 35 is decreased. This, however, is far from being a detriment because very little movement of the brake shoes is now necessary in order to get the desired braking pressure. In fact, there probably is very little movement of the brake shoes from the time they first engage the brake drum until the braking pressure is sufficient to stop the rotation of the brake drum and wheel attached thereto.

I shall now proceed to describe the means whereby when one of the brake units becomes inoperative, the other braking units still remain operative. The means is as efficient as it is simple and is illustrated in Figs. 1 and 4. Interposed in each conduit 39 is a fluid chamber 148 which comprises a dome shaped shell 143 secured to the frame 34 by bolts 144. Interposed between the dome-shaped shell 143 and a frame 34 is a flexible diaphragm 145 which in the illustrated embodiment is indicated as made of rubber. The bolts 144 hold the diaphragm in place and the diaphragm being sealed peripherally forms a barrier between the two sections of the conduit 39. One section of the conduit 39 is indicated as threaded into a pipe fitting 146 rigid with the frame and the other section of the conduit 39 is indicated as fastened to a nipple 147 secured in any desired manner as by welding or swaging to the shell 143.

Normally the diaphragm 145 occupies the position indicated in Fig. 4 when the parts of the master cylinder are in the inoperative position shown in Fig. 2. The section of the conduit 39 in Fig. 4 at the right is connected to the master cylinder and the section at the left is connected to the fluid chamber on the brake shoe support. The flow of the fluid during the application of the brake shoes to the brake drums is indicated by the arrows in Fig. 4 and as the pistons in the master cylinder move downwardly, the fluid flows through the conduit 39 to the chamber 148 on the right hand side of the diaphragm in Fig. 4, thereby causing the diaphragm to move over toward the dome-shaped side of the chamber. The chamber 148 on the left of the diaphragm is filled with the operating fluid in any desired manner such as the one which will hereinafter be described, and fills all of the space in the conduit 39 at the left and also the fluid chamber and diaphragm to which the conduit 39 is connected. Therefore as the fluid from the master cylinder moves the diaphragm to the left, the fluid at the left of the diaphragm is forced through the conduit 39 and the brake shoes are moved against the brake drum in the manner which has previously been described. The effect is practically the same as if the diaphragm 145 were not present. However, if for any reason a leakage occurs at the left of the diaphragm such as may be occasioned by failure of the equipment or by some accident which permits the fluid to leak out, or if for any other reason the fluid at the left of the diaphragm leaks out, it will not carry with it any of the fluid on the right of the diaphragm and the diaphragm which moves against the dome-shaped shell 143 retains all of the fluid between the chamber 148 and the master cylinder so that other braking units, as for instance on the other wheels of an automobile, will not be rendered inoperative but will have the necessary amount of fluid supplied thereto to apply the proper braking pressure. The diaphragm can be readily constructed to withstand the necessary operating pressures, and is rugged enough to withstand long usage. It also is very readily replaceable.

Having thus described the operation of one embodiment of my device, I wish now to turn to several modifications of supports for the diaphragms and brake shoes which embody somewhat the features of that disclosed in Figs. 5, 6, 7, 8, etc., but which have certain advantages which render them perhaps more practical and easier to construct. The first of these brake shoe supports is illustrated in Figs. 22, 23, and 24. The fluid chamber is formed in the shape of a square, tubular in cross-section, and is composed of four tubular sections 149 which can be cut from a straight tubular member and mitered so that the corners can be joined together by welding. After the sections are formed, they are united at their meeting ends by welding. This forms a tubular chamber square in cross-section as is clearly illustrated in Figs. 22 and 24. To the opposite sides of this tubular chamber there are united as by welding, the flanged side plates 150 having the upstanding bearing portions 151 for the pins 52. In these views the same reference characters apply to similar parts illustrated in Figs. 5, 6, 7, 8, etc., and operate in the same manner. The diaphragm 46 which operates the brake shoe 45 is held in communication with the fluid chamber in a manner similar to that illustrated in Fig. 5. The hollow bolt 152 having an enlarged beveled head 153 extends through the tubular chamber from one side thereof to the other and has passages 154 communicating with the interior of the fluid chamber 155. Nuts 156 hold three of the bolts 152 in place as indicated in Fig. 22 and the fourth bolt is held in place by a nut 157 which is constructed slightly different from the nuts 156. This nut 157 has a threaded opening into which there is threaded the hollow tube 158 in which there is arranged a spring 159 and ball valve 160 engaging a seat surrounding the inlet port 161. The inlet port is normally closed by a cap 162 to keep out dust and dirt and also prevent leakage of fluid out of the inlet 161 in case some of the fluid passes the ball valve 160. As previously set forth, in connection with the description of the device shown in Fig. 4, the fluid passages, including the fluid chamber 155, are filled with a fluid which must be introduced from the left hand side of the diaphragm in Fig. 4, and it is through the inlet 161 that this fluid is introduced. The cap 162 is removed and a suitable connection is threaded onto the hollow tube 158 in place of the cap and the fluid forced into the system sufficiently to entirely fill the passages. Any suitable means may be provided for releasing the air entrapped in the system. The tubular chamber 155 is also provided with a port 163 to which the conduit 39 is connected, or if desired, the fluid may be supplied through a fitting applied to one of the bolts 152 described in connection with Figs. 5, 6, 7, etc.

With this construction, the fluid chamber may be formed very readily from standard tubular sections which are sufficiently rugged to resist distortion by the clamping pressure of the nuts 156 when clamping the bolts 152 in place, thus doing away with the necessity of forming the lugs 96 shown in Fig. 8. The brake shoe support just described is also very rugged and inexpensive to construct.

In Figs. 25, 26, and 27, I have shown a modification of the device illustrated in Figs. 22, 23, and 24. Figs. 25, etc., illustrate a construction using a continuous tubular section which is bent to the shape illustrated, namely, a hexagonal, and joined at the opposite ends by welding the same as are the ends 149 of the tubular sections shown in Fig. 23. The tubular section of the chamber is indicated by the reference character 164 and is first shaped substantially to a hexagonal shape and mitered at the ends such as at 165. Thereafter the mitered ends are welded together to bring them into the position indicated in dotted lines in Fig. 26.

Also in this form of the invention, the peripheral portion for supporting the brake shoes, instead of being formed as in Figs. 22, etc., is formed by first shaping the rim portion so that it is substantially U-shaped in cross section as indicated at 166 with the upstanding bearing portions 167 for supporting the pins 52. This is then secured either by welding or any other desired manner to the outer periphery of the hexagonal fluid chamber 164.

The bolt 168 which is used to secure the diaphragm 46 in place, is provided not only with the ports 169 communicating with the chamber 164, but is also extended sufficiently beyond the inner periphery of the chamber 164 to permit me to provide additional passages 170 which communicate with a fitting 171 which has a portion embracing the bolt and an annular fluid chamber 172 communicating with the passages 170. The fitting has the inlet passage 173 which is connected to the conduit 39 through which the fluid is supplied to the fluid chamber 164. A nut 174 holds the parts in assembled relation and suitable washers 175 are interposed between the adjacent portions of the fluid chamber 164, fitting 171 and nut 174.

It will be obvious from an inspection of Figs. 25, 26, and 27, that the construction shown therein is particularly adaptable to constructions in which more than four brake shoes are used, as it is not necessary to bend the tubular section as much as where the chamber has only four sides, although I do not wish to limit myself to a fluid chamber having more than four sides.

Of course, it will be understood that any of the various parts of my invention which are obviously interchangeable may be used in any combination in order to carry out the spirit of this invention. The system may be used either with or without the diaphragm 145 but of course the diaphragm is preferred as it makes the system more foolproof and more dependable. It overcomes difficulties which have been experienced with fluid operated brakes in the past. In other words, if for any reason an automobile while it is being driven along a highway has one of the braking units rendered inoperative, the other braking units do not simultaneously become inoperative but remain fully as operative as before, and the driver of the vehicle has at least three brakes with which to stop the car instead of no brakes as in a system where a diaphragm or like device is not employed. I do not wish to limit myself to a diaphragm for accomplishing the purposes of this invention, but it is preferred that this be used and it has advantages over other structures which might be used for the same purpose. Its function is to separate the fluid in the system into a plurality of compartments so that if one compartment is destroyed, or rendered inoperative, the other compartments remain operative and the entire system is not destroyed.

In Fig. 7, I have shown a greatly exaggerated expansion for the diaphragms 46 since in ordinary practice the brake shoes do not have to move very far and the amount of permitted movement of the brake shoes according to the showing in Fig. 7 is considerably more than is actually necessary.

It will be understood that the various modifications of the diaphragm and of the brake shoes and retracting means therefor may be substituted for the corresponding elements shown in Figs. 5 and 7 without departing from the spirit of this invention or the scope of the appended claims, and obviously various changes will occur to those skilled in the art to which this invention pertains without departing from the spirit of this invention, and therefore I do not wish to be limited except as hereinafter set forth in the appended claims.

The diaphragm per se is not claimed herein, but is claimed in my copending application Serial No. 683,585, filed August 4, 1933, now issued as Patent No. 2,117,219, dated May 10, 1938.

Having thus fully described my invention, what I claim as new and desire to obtain by Letters Patent is:

1. A fluid pressure operated power device comprising a friction shoe and a metallic expansible chamber rectangular in cross section parallel to its operating surface, expansible upon fluid pressure being applied thereto, for urging said friction shoe into operative engagement with the surface to which the same is applied.

2. In a fluid pressure operated power device, the combination with a drum, of a friction shoe support, a plurality of friction shoes arranged between said support and said drum, metallic expansible fluid chambers between said friction shoes and said support, and means for introducing fluid under pressure to said chambers to simultaneously move said friction shoes in a direction toward said drum, each expansible fluid chamber being substantially equal to its operated friction shoe in length.

3. In a fluid pressure operated power device, the combination with a drum, of a friction shoe support, a plurality of friction shoes arranged between said support and said drum, metallic expansible fluid chambers between said friction shoes and said support for supporting said friction shoes, means for introducing fluid under pressure to said chambers to simultaneously move said friction shoes in a direction toward said drum, and means for retracting the shoes when the pressure on the fluid is released, said metallic fluid chambers constituting the only direct means for supporting the shoes against movement by said retracting means.

4. In a brake construction, the combination with a brake shoe support having the outer periphery thereof formed with a plurality of relatively flat sides, a fluid chamber formed at the outer periphery of said support but inwardly of said flat sides, relatively flat metallic expansible diaphragms mounted on said flat sides, brake shoes on each of said diaphragms, flanges contiguous with the outer periphery of said support and extending outwardly on opposite sides of said flat sides, means associated with said brake shoes and flanges for preventing rotative movement of said brake shoes about said support while permitting outward movement of said brake shoes, means for introducing fluid under pressure to said peripheral chamber and to said expansible diaphragms, and means for retracting said brake shoes inwardly toward said support when the fluid pressure is released.

5. In a brake construction, the combination with a support having an outer peripheral metallic fluid receiving chamber, a plurality of expansible diaphragms arranged about said peripheral chamber, brake shoes actuated by said diaphragms when the latter are expanded by fluid pressure, and means for connecting each of said diaphragms in fluid-tight communication with said peripheral chamber comprising an opening extending through said chamber, a hollow bolt having an enlarged head arranged within the diaphragm having the shank thereof extending through said opening, and a nut for drawing said enlarged head toward the adjacent side of said chamber with a portion of the said diaphragm therebetween whereby the diaphragm is held in fluid-tight communication with said peripheral chamber.

6. A support for fluid pressure operated brakes comprising a multi-sided metallic tubular frame formed by uniting straight tubular sections together at an angle with respect to each other to form a fluid-tight chamber, brake shoes, and fluid expansible diaphragms communicating with said chamber for actuating said brake shoes and arranged about said frame.

7. In a fluid pressure operated brake having brake shoes, the combination with a multi-sided support, of a tubular chamber arranged peripherally of said support comprising straight metallic tubular sections welded together at angles to each other to form fluid-tight connections therebetween, and a continuous annular fluid chamber for supplying fluid to diaphragms for operating the brake shoes of the fluid operated brake, and diaphragms positioned between the brake shoes and the sides of said support having communication with the fluid chamber whereby the fluid may enter said diaphragm and urge the brake shoes into engagement with a braking surface.

8. In a fluid operated brake having brake shoes, the combination with a multi-sided support and a continuous metal tubular fluid chamber surrounding said multi-sided support formed from a continuous tubular member bent at various points along its length to form a multi-sided support and joined at the free ends thereof to form a fluid-tight chamber adapted to supply fluid to the means which operates the brake shoes of the fluid operated brake.

9. In a brake construction, a friction piece, a brake drum, and a plurality of radially movable brake shoes for moving the friction piece into engagement with the brake drum.

10. In a fluid pressure operated power device, a plurality of friction lining members, a drum, and a plurality of operating shoes for moving the members into engagement with the drum, each member being operable by a plurality of shoes.

11. In a brake construction, a brake drum, a plurality of circumferentially arranged brake lining members, a plurality of circumferentially arranged and radially movable brake shoes for moving the lining members into engagement with the drum, each lining member extending over adjacent portions of adjacent shoes.

12. In a brake construction, a brake drum, a plurality of circumferentially arranged brake lining members, a plurality of circumferentially arranged and radially movable brake shoes for moving the lining members into engagement with the drum, each lining member extending over adjacent portions of adjacent shoes, and being secured to but one of said shoes.

13. In a brake construction, a support, a plurality of circumferentially arranged brake shoes, means for mounting the shoes upon the support, said mounting means permitting radial movement of the shoes with respect to the support, and friction members operable by said shoes extending between adjacent mounting means.

14. In a brake construction, a support, a plurality of circumferentially arranged brake shoes, means for mounting the shoes upon the support, said mounting means permitting radial movement of the shoes with respect to the support, and a metallic expansible diaphragm substantially coextensive with each shoe for operating it radially.

15. In a fluid pressure operated power device, a support, a polygonal fluid chamber carried by said support, a metallic expansible diaphragm on each face of said chamber having fluid communication with the chamber, and a friction shoe operable by each expansible diaphragm and substantially coextensive therewith, the shoe being mounted on said support but being free to move radially with respect thereto.

16. In a brake construction, a fluid chamber having a number of substantially flat faces, an expansible diaphragm in fluid communication with said chamber having an inner supporting face by which it is supported upon one face of the fluid chamber and an outer operating face, and a brake shoe engaged by said outer operating face, said brake shoe, the faces of the diaphragm, and said face of the chamber being substantially co-extensive.

17. In a brake construction, in combination with a brake shoe support having a fluid chamber at the outer periphery thereof forming a plurality of relatively flat sides, relatively flat metallic expansible diaphragms comprising a plurality of superposed flat plates mounted on said flat sides, and brake shoes on each of said diaphragms.

18. In a brake construction, a polygonal fluid chamber, a rectangular expansible diaphragm on each face of said chamber having fluid communication with the chamber, each diaphragm being substantially coextensive with its contacting chamber face, and braking means operable by each expansible diaphragm.

19. In a brake construction, a brake drum, a plurality of circumferentially arranged braking devices operable toward the brake drum, and metallic superposed chamber expansible diaphragm means for operating the braking devices, said diaphragm means being separated slightly at spaced points.

20. In a brake construction having a brake drum, a support member having a number of substantially flat faces, a plurality of rectangular expansible diaphragms carried by said support member in circumferential arrangement, and brake drum engaging means operated by said diaphragms, each of said diaphragms comprising a multiple plate metallic bellows collapsible to a size no greater than the combined thickness of the diaphragm plates.

21. In a fluid pressure operated power device, a brake drum, a plurality of circumferentially disposed friction brake devices, said devices being shaped and arranged together to form a braking surface and a plurality of oppositely disposed diaphragm engaging surfaces separated slightly at spaced points, and a plurality of circumferentially disposed expansible metallic diaphragms engageable with the devices for operating them, there being a diaphragm for each device, and the operating surface of each diaphragm being substantially commensurate with the diaphragm engaging surface of the device with which it engages.

22. In a fluid pressure operated power device, a circular brake drum, a plurality of circumferentially disposed friction brake devices, said devices being shaped and relatively arranged together to form a circular operating surface cooperable with the drum and an oppositely disposed polygonal surface, a polygonal support structure, and individual polygonally disposed metallic expansible diaphragms arranged respectively between the sides of the polygonal support structure and the respective polygonal surfaces of the brake devices.

23. In a fluid pressure operated power device, a drum, a plurality of circumferentially disposed shoes operable theretoward, a polygonal support structure having sides corresponding to each of the shoes, and a plurality of circumferentially disposed metallic expansible diaphragms arranged respectively between the support structure and the shoes, each of said diaphragms comprising a plurality of superposed rectangular flat plates arranged to form a plurality of superposed expansible diaphragm chambers, the plates for each chamber being adapted to collapse into contacting superposed relation upon collapse of the diaphragm.

24. In a fluid pressure operated power device, a circular brake drum, a plurality of circumferentially disposed friction brake devices, said devices being shaped and relatively arranged together to form a circular operating surface cooperable with the drum and an oppositely disposed polygonal surface, a polygonal support structure, and a metallic diaphragm structure comprising a plurality of groups of superposed flat plates, said plate groups being slightly separated and arranged between the sides of the polygonal support structure and the respective polygonal surfaces of the brake devices.

25. In a fluid pressure operated power device, a circular brake drum, a braking device engageable with the drum, a support member, and a metallic diaphragm structure having its operating axis radially disposed with respect to the brake drum and arranged between said braking device and said support member, said diaphragm structure comprising a plurality of rectangular superposed relatively flat expansible diaphragm chambers.

26. In a fluid pressure operated power device, a circular drum, a friction device engageable with the drum, a support member, and a diaphragm structure having its operating axis radially disposed with respect to the drum and arranged between said friction device and said support member, said diaphragm structure comprising a plurality of rectangular superposed relatively flat plates arranged to form a plurality of superposed expansible diaphragm chambers, certain of the chamber forming plates being collapsible into contacting relation.

27. In a fluid pressure operated power device, a brake drum, a plurality of circumferentially arranged braking devices, a circumferential support structure, and a diaphragm structure arranged between said braking devices and said support structure, said diaphragm structure comprising a plurality of rectangular superposed relatively flat plates arranged to form a plurality of superposed expansible diaphragm chambers, certain of the chamber forming plates being collapsible into contacting relation and the combined thickness of said superposed chambers being less than half the width thereof.

28. In a fluid pressure operated power device, a brake drum, a circumferentially disposed friction braking device separated slightly at spaced points movable toward the drum for cooperation therewith, and a circumferentially arranged metallic expansible diaphragm structure also separated slightly at spaced points engageable with the braking device for operating it, said diaphragm structure comprising a plurality of superposed expansible diaphragm chambers.

29. In a fluid pressure operated power device, a brake drum, a plurality of circumferentially disposed brake devices operable thereagainst, a support structure, and a plurality of circumferentially disposed metallic expansible diaphragms arranged between the support structure and the brake devices, each of said diaphragms comprising a plurality of rectangular superposed expansible chambers, the combined thickness of said chambers being less than half the width thereof.

30. In a fluid pressure operated power device, a brake drum, a plurality of circumferentially disposed friction brake devices, and a plurality of circumferentially disposed metallic expansible diaphragms engageable with said devices for operating them, each of said diaphragms comprising a plurality of rectangular superposed relatively flat plates arranged to form a plurality of superposed expansible diaphragm chambers.

31. A brake comprising a brake shoe, and a metallic expansible chamber rectangular in cross section parallel to its operating surface expansible upon fluid pressure being applied thereto for urging said brake shoe into operative engagement with the surface to which the same is applied, said expansible chamber having its operating cross section substantially coextensive with said brake shoe.

32. In a brake construction having a brake drum, a support structure, a plurality of flat metallic expansible diaphragms carried by said support structure, and brake drum braking means operated by said diaphragms, said means directly contacting the diaphragms and being substantially equal in length therewith.

33. In a fluid pressure operated power device having a drum, a support structure having a number of substantially flat faces, a plurality of rectangular expansible diaphragms carried by said support structure in circumferential arrangement, and drum engaging means operated by said diaphragms, adjacent diaphragms being in close juxtaposition at their ends.

34. In a fluid pressure operated power device having a drum, a plurality of individual rectangular expansible diaphragms polygonally arranged and in close juxtaposition at their ends, and drum engaging means operated by said diaphragms.

35. In a fluid pressure operated power device, a brake drum, a plurality of circumferentially disposed friction brake devices closely adjacent each other at their ends and movable toward the drum for cooperation therewith, and a plurality of circumferentially disposed expansible metallic diaphragms also closely adjacent each other at their ends engageable with the shoes for operating them, there being a diaphragm for each device, and each diaphragm being substantially equal in length to the length of the device with which it engages.

WILLIAM CLIFFORD SHAW.